Figure 6:
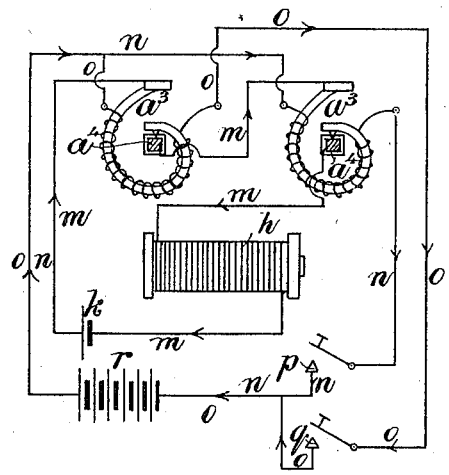

No. 706,177. Patented Aug. 5, 1902.
T. M. HEAPHY.
MEANS FOR TESTING THERMOSTATS.
(Application filed Aug. 8, 1900.)
(No Model.) 2 Sheets—Sheet 1.
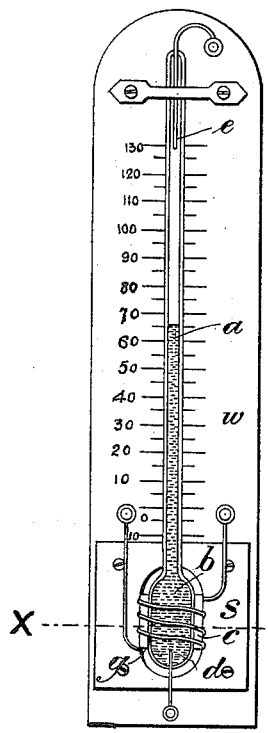
Fig.1.
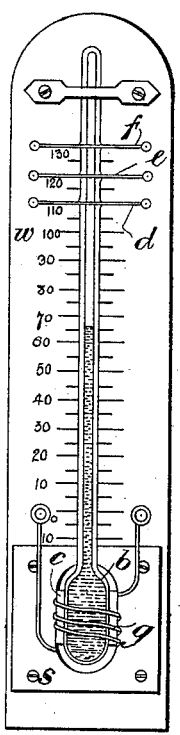
Fig.3.
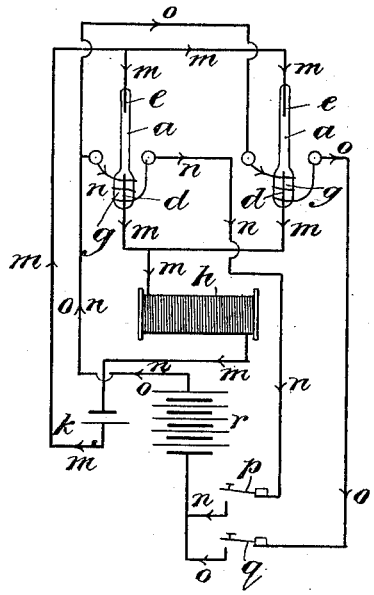
Fig.4.
Fig.2.
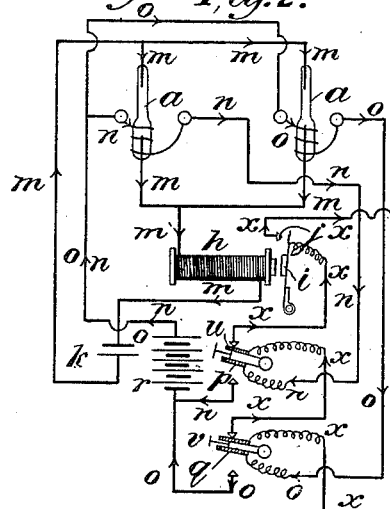
Fig.5.
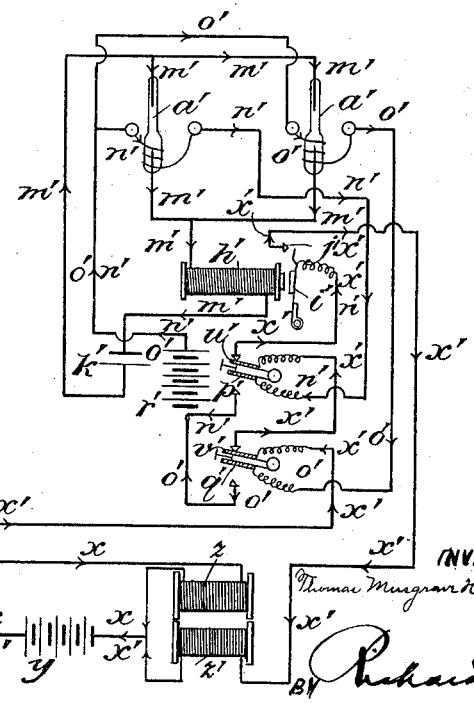
WITNESSES:
Ella L. Giles
Otto Musak
INVENTOR
Thomas Musgrave Heaphy
BY Richards
ATTORNEYS No. 706,177. Patented Aug. 5, 1902.
T. M. HEAPHY.
MEANS FOR TESTING THERMOSTATS.
(Application filed Aug. 8, 1900.)
(No Model.) 2 Sheets—Sheet 2.

WITNESSES:
Ella L. Giles
O. Dunn

INVENTOR
Thomas Musgrave Heaphy
BY
Richards & Co
ATTORNEYS

UNITED STATES PATENT OFFICE.

THOMAS MUSGRAVE HEAPHY, OF LONDON, ENGLAND.

MEANS FOR TESTING THERMOSTATS.

SPECIFICATION forming part of Letters Patent No. 706,177, dated August 5, 1902.

Application filed August 8, 1900. Serial No. 26,312. (No model.)

*To all whom it may concern:*

Be it known that I, THOMAS MUSGRAVE HEAPHY, electrical engineer, a subject of the Queen of Great Britain and Ireland, residing at 25 Craven Terrace, Bayswater, London, W., in the county of Middlesex, England, have invented certain new and useful Improvements Connected with Fire-Alarm and other Thermostats, (for which I have made application for Letters Patent in Great Britain, No. 3,886, dated May 28, 1900,) of which the following is a specification.

My invention relates to means of testing thermostats and their electric circuits.

At present the alarm or signaling bell and indicator circuits of thermostats are easily tested to prove that they are in working condition when not closed by the thermostat-contacts; but there is a difficulty in testing them to prove that the circuits will be closed and the alarm given by a rise of temperature in the thermostat itself. This difficulty is so great that the thermostats are seldom or never tested as thermostats after being installed. This is a great disadvantage, as the thermostats may get out of working order and not be able to give the alarm or signal when required. For example, a mercury thermostat may fail through the mercury not being able to close the thermostat-circuits owing to the glass tube or bulb being broken, or the thermostat may get injured either accidentally or maliciously or get so out of order that it cannot act at all when the requisite rise in temperature takes place caused by a fire, and yet the present tests might indicate that the alarm or signaling bell and indicator circuits were in perfect condition, and so cause a feeling of false security to be engendered and the building containing the thermostats be from a fire-risk point of view in a worse condition than if thermostats had not been used, as watchmen and other precautions might have been in consequence dispensed with. In any case the defect in the thermostat may not be detected, owing to there being no proper way of testing it. It is obvious that the consequences of this inability to test the thermostat may be very serious. The object of my invention is to remove this difficulty.

My invention consists in heating the thermostat artificially by an electric current from any convenient source passing through a suitable resistance close to or in contact with the thermostat. This produces the same effects so far as the thermostat is concerned as a rise of temperature in the air surrounding the thermostat (or as a rise of temperature in the room or place in which the thermostat is situated) due to a natural or other cause, which rise of temperature when it has reached a given amount the thermostat is intended to indicate. It therefore tests not only the thermostat itself, but all the electric circuits and any mechanism connected with or controlled by the thermostat.

I shall describe my invention with reference to a thermostat which acts by the expansion of mercury in a tube electrically connecting two wires sealed through the sides or ends of the tube, and thus closing an electric circuit; but I wish it to be understood that my invention is also applicable to thermostats which use other fluids or combinations of fluids and also to thermostats which act by the expansion of solids or the expansion of gases—in fact, to almost any form of thermostat.

The thermostat in itself forms no part of my invention.

Figure 7:
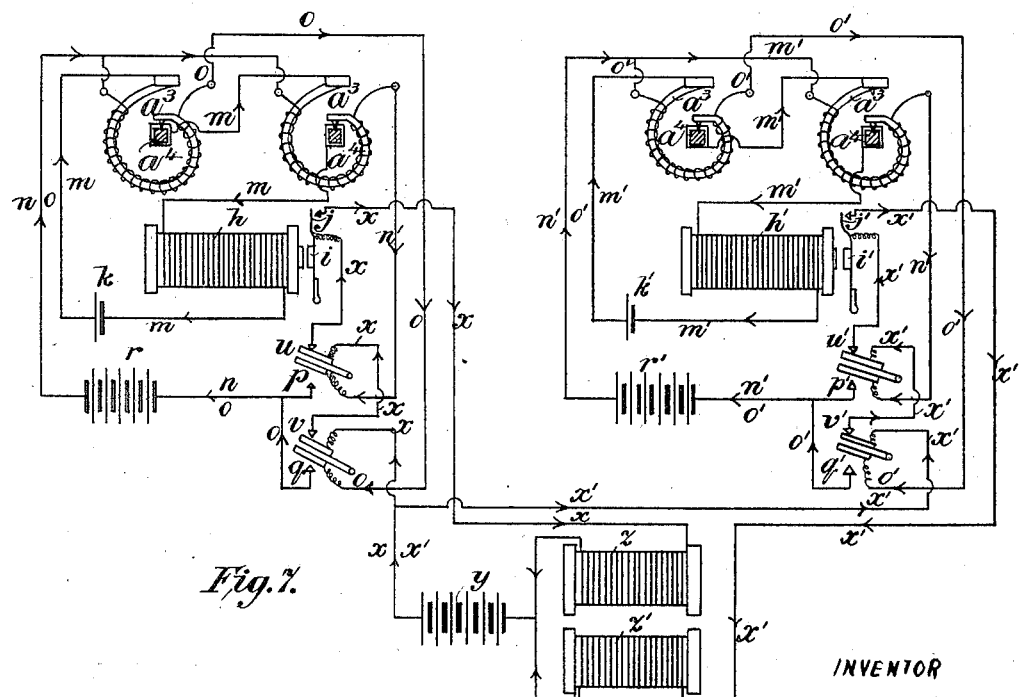

Referring now to the accompanying drawings, which illustrate my invention, Figure 1 shows in elevation a thermostat fitted with a heating-coil around its bulb. Fig. 2 is a section of the same on the line X X of Fig. 1. Fig. 3 shows another form of thermostat. Fig. 4 is a diagrammatic view illustrating the working and testing of a thermostat signaling system constructed and arranged according to one modification of my invention for use in a building where it is desired only to give an alarm or signal on the spot or in the premises. Fig. 5 is a diagrammatic view illustrating the working and testing of a thermostat signaling system constructed and arranged for a number of buildings and a central station according to one modification of my invention. Figs. 6 and 7 are diagrammatic views of modifications of the arrangements for working and testing thermostat systems shown in Figs. 4 and 5, the thermostats being arranged in series with each other in the respective circuits.

In Figs. 1 and 2, $a$ is the thermostat-tube, carried by a suitable support $w$, which may be of wood. A platinum wire $d$ passes through the bulb $b$ of the thermostat, so as to make contact with the mercury which is contained in the bulb and extends partly up the tube $a$. Another platinum wire $e$ passes through the top of the tube $a$, so as to make contact with the mercury when the latter rises sufficiently high in the tube—say to 130° Fahrenheit. When this takes place, the wires $d$ and $e$ are electrically connected and an electric circuit is closed which rings a bell or gives some other signal. $g$ is the electrical heater, which consists of a coil of wire of high electrical resistance surrounding the bulb $b$ in such a way as to screen it as little as possible from external heat. I may advantageously use a few turns of bare platinum wire for this purpose, preventing short-circuiting by interposing a piece of asbestos $c$ or other non-inflammable resilient material over part of the bulb and inside the coil. This material expands slightly when the pressure of the wire around it is relieved by its expansion when heated, and so keeps the turns of the coil from making contact with each other. If the thermostat-support $w$ is of wood or other combustible material, I place a slab $s$, of slate or porcelain or marble or other insulating non-combustible material, at the back of the bulb and heating-coil, so as to prevent any possibility of $w$ being burned or charred if an excess of current passed through the coil $g$ or $s$ might leave an open space at the back of the bulb.

Fig. 3 shows a thermostat the same as the one just described except that instead of having wires $d$ and $e$ at the bottom and top, respectively, it has three wires $d$, $e$, and $f$, each passing through both sides of the tube. The top wire may stand at, say, 130° on the Fahrenheit scale, the next one, say, at 120°, and the lowest wire at any place below this. When the mercury rises to the wire $e$, this is electrically connected to $d$ and a circuit is closed, which may be employed to ring a warning-bell or give some other signal. When the temperature causes the mercury to rise to the wire $f$, another circuit is closed, which may be employed to give a fire-alarm at a central or fire station.

Fig. 4 illustrates diagrammatically the working and testing of a thermostat signaling system constructed and arranged according to one modification of my invention for use in a building where it is desired only to give an alarm on the premises. In this figure, $a\,a$ are two thermostats fitted in different parts of the building and of a type similar to that illustrated in Figs. 1 and 2. The thermostats, as regards their terminals $d$ and $e$, are placed in parallel on an electric circuit $m\,m$, which includes the electromagnet $h$ and the battery or other source of electric current $k$. When the mercury in either thermostat rises sufficiently, it will connect $d$ with $e$, thereby closing the circuit $m\,m$ and sending an energizing-current through the coils of the electromagnet $h$. This electromagnet is adapted to actuate mechanism (electric or other) which rings a bell or otherwise indicates that a thermostat has reached a definite temperature. This mechanism may be of any known or suitable nature. It does not in itself form part of my invention. The circuits for testing the thermostats are lettered $n\,n$ and $o\,o$. These circuits include the heating-coils $g\,g$ of the thermostats, one heating-coil being on each circuit and both circuits receiving current from the battery or other source of electric current $r$. The circuit $n\,n$ is closed by the switch $p$ and the circuit $o\,o$ by the switch $q$. Therefore in order to test either thermostat it is only necessary to close the corresponding switch, and the thermostat will be heated by means of the heating-coil $g$ till the mercury rises high enough to close the circuit $m\,m$ and give the signal.

Although I have described and illustrated only two thermostats in the building, it is obvious that the number may be increased to almost any desired extent.

Fig. 5 illustrates diagrammatically the working and testing of a thermostat signaling system constructed and arranged according to one modification of my invention for use in a number of buildings connected by wires with a central or fire station. The thermostats $a\,a$ are placed in parallel on the circuit $m\,m$ in one building and the thermostats $a'\,a'$ in parallel on the circuit $m'\,m'$ in another building. The circuit $m\,m$ includes the battery (or other source of electric current) $k$ and the electromagnet $h$. Similarly the circuit $m'\,m'$ includes the battery $k'$ and electromagnet $h'$. The heating-coils of the thermostats $a\,a$ are placed on the circuits $n\,n$ and $o\,o$, respectively, both circuits receiving current from the battery or other source of electric current $r$. The heating-coils of the thermostats $a'\,a'$ are placed on the circuits $n'\,n'$ and $o'\,o'$, respectively, both circuits receiving current from the battery $r'$. The four circuits are closed and broken by the switches $u$ and $v$ and $u'$ and $v'$, respectively, the first two being situated on the first building and the last two on the second building. The electromagnet $h$ when energized attracts the armature $i$, which closes the switch $j$, which completes the circuit $x\,x$ including the electromagnet $z$ and the battery or other source of electric current $y$. Similarly the electromagnet $h'$, by means of the armature $i'$, closes the switch $j'$, which completes the circuit $x'\,x'$. This circuit includes the electromagnet $z'$ and the battery $y$. The battery $y$ and the electromagnets $z$ and $z'$ are situated in the central or fire station. When the temperature of any thermostat—say one of the thermostats $a$—rises to a given point, the circuit $m\,m$ will be closed, as before described. The electromagnet $h$ will therefore be energized, the armature $i$ attracted, and the switch $j$ closed. A current will then be sent through the circuit $x\,x$ by the battery $y$. This current will energize the electromagnet $z$, which may be used to actuate any mechanism (electric or otherwise) for giving a signal or alarm. Similarly if one of the thermostats $a'$ be raised in temperature to a given point the electromagnet $z'$ will be energized and a different signal given, so that it can be ascertained at the central or fire station in which building or premises is situated the thermostat which has operated or is operating. I do not, however, confine myself to the arrangement just described of having two electromagnets at the central or fire station. I may adapt any device whereby electric currents passing along the wires $x\ x$ and $x'\ x'$ are caused to give distinguishing signals. The electromagnets $h$ and $h'$ may also actuate mechanism to give a signal in the premises in which the thermostats are installed, as described with reference to Fig. 4.

Instead of having the circuits $x\ x$ and $x'\ x'$ closed by the action of the electromagnets $h$ and $h'$ I may have them closed by the thermostat itself, using a thermostat with three wires, as shown in Fig. 3, the first and second wires closing the circuits $m\ m$ or $m'\ m'$ and the first and third wires the circuits $x\ x$ or $x'\ x'$.

The thermostats are tested by closing the switches $p$ and $q$ and $p'$ and $q'$, as hereinbefore described with reference to Fig. 4. In this case, however, the switches $p$, $q$, $p'$, and $q'$ are respectively connected to the switches $u$, $v$, $u'$, and $v'$ on the circuits $x\ x$ and $x'\ x'$, so that when, for instance, the switch $p$ is closed the switch $u$ will be open, and vice versa. This interdependence of the switches prevents an alarm being given at the central or fire station when any thermostat is being tested. The double switches shown on the drawings are of course only diagrammatic. Any known or suitable double switch or device for accomplishing the object may be used.

Although I have described and illustrated only two thermostats in each building and only two buildings, it is obvious that the number in both cases may be increased as desired.

It is evident that the thermostats may be tested from the central or fire station by placing the switches $p$ and $q$ and also, if desired, the batteries $r$ and $r'$ in this station instead of in the building where the thermostats are installed. I prefer, however, to test on the premises.

In both of the modifications already described instead of arranging the thermostats in parallel on the circuits $m\ m$ and $m'\ m'$ I may have a current continuously flowing in these circuits by arranging the thermostats in series, as illustrated in Figs. 6 and 7. The thermostats in this case are constructed of curved bars of metal $a^3$, fixed at one extremity, while the other ends are free and make contact with terminal blocks $a^4$, connected to the circuits $m\ m$ and $m'\ m'$, respectively. Instead of curved metal bars as thermostats I may employ curved tubes filled with liquid or any other form of thermostat which normally allows the passage of a current through it and breaks the circuit by expansion on heating. The remaining connections of the thermostat-testing and alarm circuits are arranged precisely as in Figs. 4 and 5, the only alteration being in the method of operation of an electromagnet $h$, which gives the required signal on interruption of the current in its windings. In the modifications shown in Fig. 7 the contacts $j\ j'$ are made by the release of the armatures $i\ i'$, respectively, which takes place on operation of the thermostats.

The batteries $r$ or $r'$ may be either stationery or portable. In some cases I prefer that they should be portable and should be brought by an inspector when the latter comes to inspect and test the thermostats in any building or premises. I may, however, take current from the electric-light mains for testing purposes, placing a lamp in series with the thermostat-heating coil to increase the resistance of the circuit. I find that a ninety-volt lamp placed in series with a thermostat-heating coil across one-hundred-volt mains answers very well. The lamp is also useful for showing when current is passing through the heating-coils.

My invention is chiefly intended to be applied to fire-alarm thermostats; but it is also applicable to thermostats for other purposes. For example, it may be applied to thermostats used in incubators for testing whether the thermostats are in working order.

Having thus described my invention, what I claim as new, and desire to secure by Letters Patent, is—

In a fire-alarm system having a thermostat and its terminals in circuit with a source of electric current and a local alarm device, a heating resistance in proximity to the thermostat and in circuit with a source of electric current, one of the extremities of the said circuit being connected to a contact-point and the other extremity to a contact-piece on a movable switch-arm; a second insulated contact-piece on said switch-arm forming one extremity of a circuit including a source of electric current, a distant central-station alarm device and an automatic switch operated by the local alarm device; the other extremity of said circuit being connected to a terminal adapted for contact with the terminal on the switch-arm, whereby the thermostat and its alarm connections at the local station may be tested while allowing the alarms at the local and distant stations to operate simultaneously in case of fire, as set forth.

In witness whereof I have hereunto set my hand in presence of two witnesses.

THOMAS MUSGRAVE HEAPHY.

Witnesses:
MATTHEW ATKINSON ADAM,
WALTER J. SKERTEN.